US010100895B2

United States Patent
Callies et al.

(10) Patent No.: US 10,100,895 B2
(45) Date of Patent: Oct. 16, 2018

(54) DAMPING VALVE COMPRISING A PRESSURE RELIEF VALVE

(71) Applicant: ZF Friedrichshafen AG, Friedrichshafen (DE)

(72) Inventors: Lothar Callies, Poppenhausen (DE); Timo Schaffelhofer, Bad Kissingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/501,352

(22) PCT Filed: Jul. 6, 2015

(86) PCT No.: PCT/EP2015/065287
§ 371 (c)(1),
(2) Date: Feb. 2, 2017

(87) PCT Pub. No.: WO2016/020125
PCT Pub. Date: Feb. 11, 2016

(65) Prior Publication Data
US 2017/0219042 A1    Aug. 3, 2017

(30) Foreign Application Priority Data

Aug. 6, 2014   (DE) .................. 10 2014 215 571

(51) Int. Cl.
*F16F 9/34*   (2006.01)
*F16F 9/46*   (2006.01)
*F16K 17/04*  (2006.01)

(52) U.S. Cl.
CPC ............... *F16F 9/34* (2013.01); *F16F 9/465* (2013.01); *F16K 17/0406* (2013.01)

(58) Field of Classification Search
CPC .. F16F 9/34; F16F 9/3405; F16F 9/342; F16F 9/50; F16F 9/516
USPC ... 188/266.1, 266.5, 266.6, 316, 317, 319.1, 188/322.13, 322.15
See application file for complete search history.

(56) References Cited

U.S. PATENT DOCUMENTS

| 5,085,299 | A | | 2/1992 | Tischler | |
|---|---|---|---|---|---|
| 5,129,489 | A | * | 7/1992 | Majima | ..................... F16F 9/46 188/266.7 |
| 5,850,896 | A | * | 12/1998 | Tanaka | ..................... F16F 9/465 188/266.2 |
| 6,003,644 | A | * | 12/1999 | Tanaka | ..................... F16F 9/466 188/266.2 |
| 6,119,831 | A | | 9/2000 | Knecht | |

(Continued)

FOREIGN PATENT DOCUMENTS

| DE | 3835705 | 4/1990 |
|---|---|---|
| DE | 4401689 | 7/1995 |

(Continued)

*Primary Examiner* — Thomas J Williams
(74) *Attorney, Agent, or Firm* — Cozen O'Connor

(57) ABSTRACT

An adjustable damping valve (12) includes a pressure space (22*c*) for controlling the damping valve (12), which pressure space (22*c*) is arranged inside the damping valve (12) and is connected to a further space (20) via at least one choke orifice (30) for the flow of damping medium, and the pressure space (22*c*) is operatively connected to the further space (20) via a pressure relief valve (32).

9 Claims, 3 Drawing Sheets

(56) References Cited

U.S. PATENT DOCUMENTS

| | | | |
|---|---|---|---|
| 8,485,224 B2 * | 7/2013 | Forster | F16F 9/464 188/266.5 |
| 2008/0029165 A1 | 2/2008 | Beck | |
| 2011/0168935 A1 | 7/2011 | Heyn | |
| 2012/0205567 A1 | 8/2012 | Förster | |

FOREIGN PATENT DOCUMENTS

| | | |
|---|---|---|
| DE | 4406373 | 8/1995 |
| DE | 19822448 | 1/1999 |
| DE | 102006036691 | 8/2002 |
| DE | 69525896 | 2/2008 |
| DE | 102008041735 | 1/2010 |
| DE | 102009059808 | 6/2011 |
| DE | 102010062264 | 6/2012 |
| EP | 0400395 | 12/1990 |

* cited by examiner

DAMPING VALVE COMPRISING A PRESSURE RELIEF VALVE

PRIORITY CLAIM

This is a U.S. national stage of application No. PCT/EP2015/065287, filed on Jul. 6, 2015. Priority is claimed on the following application(s): Country: Germany, Application No.: 10 2014 215 571.1, Filed: Aug. 6, 2014; the content of which is incorporated herein by reference in its entirety.

FIELD OF THE INVENTION

The invention is directed to a damping valve including a pressure relief valve and to a vibration damper with a damping valve of this type.

BACKGROUND OF THE INVENTION

A generic damping valve for a vibration damper is shown in DE 10 2009 059 808 A1. The damping valve forms an annular control space. This control space is operatively connected to an upper working space of the vibration damper via a choke orifice. Further, the control space is limited by a main stage body and valve housing. Main stage body and valve housing are aligned with one another via guide surfaces and can be displaced axially relative to one another. Further, the guide surfaces seal the control space substantially relative to the other spaces in the damping valve. At high temperatures and high loading of the damping valve, for example, with large volume flows, leakages can take effect at the guide surfaces and generate a damping medium flow into the control space via the guide surfaces leading to an additional closing force on the main stage body. In this way, the pressure in the interior of the valve and in the control space rises sharply, and the damping medium flowing into the control space cannot be removed quickly enough via the choke orifice under extreme conditions. Accordingly, the damping medium can foam so that a damping action during a subsequent movement of the damping valve has a substantially reduced effect. Moreover, a gas barrier at a piston rod guide can be rendered useless or can be damaged.

Therefore, it is an object of the present invention to provide a damping valve which prevents an overpressure in the damping valve, particularly at high temperatures and high loading in the push direction.

SUMMARY OF THE INVENTION

At least one choke orifice at a damping valve serves as a permanent connection between a pressure space which is arranged inside the damping valve and a further space. But during high loading of the damping valve, this choke orifice may not be sufficient for reducing an overpressure in the pressure space quickly enough. Therefore, a pressure relief valve which allows a sufficient outflow of damping medium and reduces or prevents an overpressure in the pressure space, particularly under high loading, is arranged at the pressure space. This pressure relief valve is arranged between the pressure space, which can be, for example, a control space of the damping valve, and a further space. The pressure relief valve can connect or operatively connect the pressure space and the further space directly, i.e., without further spaces or channels therebetween, or indirectly. In addition, the further space can be arranged inside or outside the damping valve. In order to reduce the high pressure, the pressure relief valve opens so that the damping medium can flow through an opening of the pressure relief valve out of the pressure space into the further space.

The damping valve can be adjustable among other things, particularly electronically adjustable. Further, the damping valve preferably has a damping arrangement in the form of compression damping and rebound damping. It is further possible that the damping valve shows a multi-stage characteristic line or a characteristic line with a plurality of sections of different damping force or damping force curves. Inter alia, the damping valve can be used for a single-tube vibration damper and for a twin-tube vibration damper.

In a preferred constructional variant, the pressure relief valve is connected in parallel with the choke orifice. The total flow quantity of damping medium and particularly the outflow cross section from the pressure space to the further space can be increased in this way.

In another constructional variant, the pressure relief valve forms the choke orifice. In this case, the pressure relief valve can permanently have a determined flow cross section which increases starting from a certain overpressure in that the pressure relief valve opens.

The pressure relief valve is advantageously formed by a check valve. The check valve may be formed in accordance with German Offenlegungsschrift DE 10 2006 036 691 A1, the entire contents of which are incorporated herein by reference. At an overpressure, the check valve can release an opening which allows the pressure medium to flow out of the pressure space or allows the overpressure to be reduced in the control space.

According to a constructional variant, when the damping valve is loaded the pressure relief valve releases in a first direction and blocks in a second direction, or restricts the flow of damping medium through the damping valve in the second direction, particularly through a check valve. A restriction in a second direction can correspond, for example, to a flow cross section which is smaller than the flow cross section in the first direction when the pressure relief valve is open. In this case, the pressure relief valve can be considered unrestricted. Therefore, a flow of damping medium in the first direction through the pressure relief valve can be substantially greater than in the second direction. The pressure relief valve blocks in a second direction preferably when the pressure relief valve is connected in parallel with the choke orifice. Further, the pressure relief valve restricts in a second direction advantageously when the pressure relief valve forms the choke orifice.

A blocking or restriction of the pressure relief valve in the second direction is advantageous particularly when the pressure space forms a control space of the damping valve and accordingly, depending on the pressure inside the control space, influences a damping action in only one operating direction of the damping valve, for example, in push direction or in pull direction. In this way, the original damping characteristic of the damping valve is retained in the second direction. Further, the overpressure in the pressure space can be reduced in the first direction. Further explanations for reducing overpressure will be gathered from the description of the drawings.

In a preferred embodiment, the first direction corresponds to a loading of the damping valve in push direction or in pull direction. The pressure relief valve can accordingly be adapted to the construction and operation of the damping valve in an optimal manner.

In a further constructional variant, the overpressure valve is opened when the damping valve is loaded in the first direction after a certain pressure difference $\Delta P$, in particular a pressure difference $\Delta P \geq 0$, between the pressure space and the further space. Therefore, it is possible to adapt the damping characteristic of the damping valve to requirements in an optimal manner. In order to ensure that the pressure relief valve does not open until after a certain pressure difference has been reached, it may be advantageous to use a preloaded check valve.

The further space is advantageously formed by a working space outside of the damping valve. This is advantageous particularly when the working space always has a lower pressure than the pressure space when the damping valve is loaded in the first direction.

Further, a vibration damper is suggested which has a damping valve according to one of claims 1 to 8 or according to at least one of the above described constructions.

BRIEF DESCRIPTION OF THE DRAWINGS

The vibration damper according to the invention and the associated damping valve will be described by way of example in the following with reference to the accompanying drawings in which.

DETAILED DESCRIPTION OF THE PRESENTLY PREFERRED EMBODIMENTS

Figure 1:
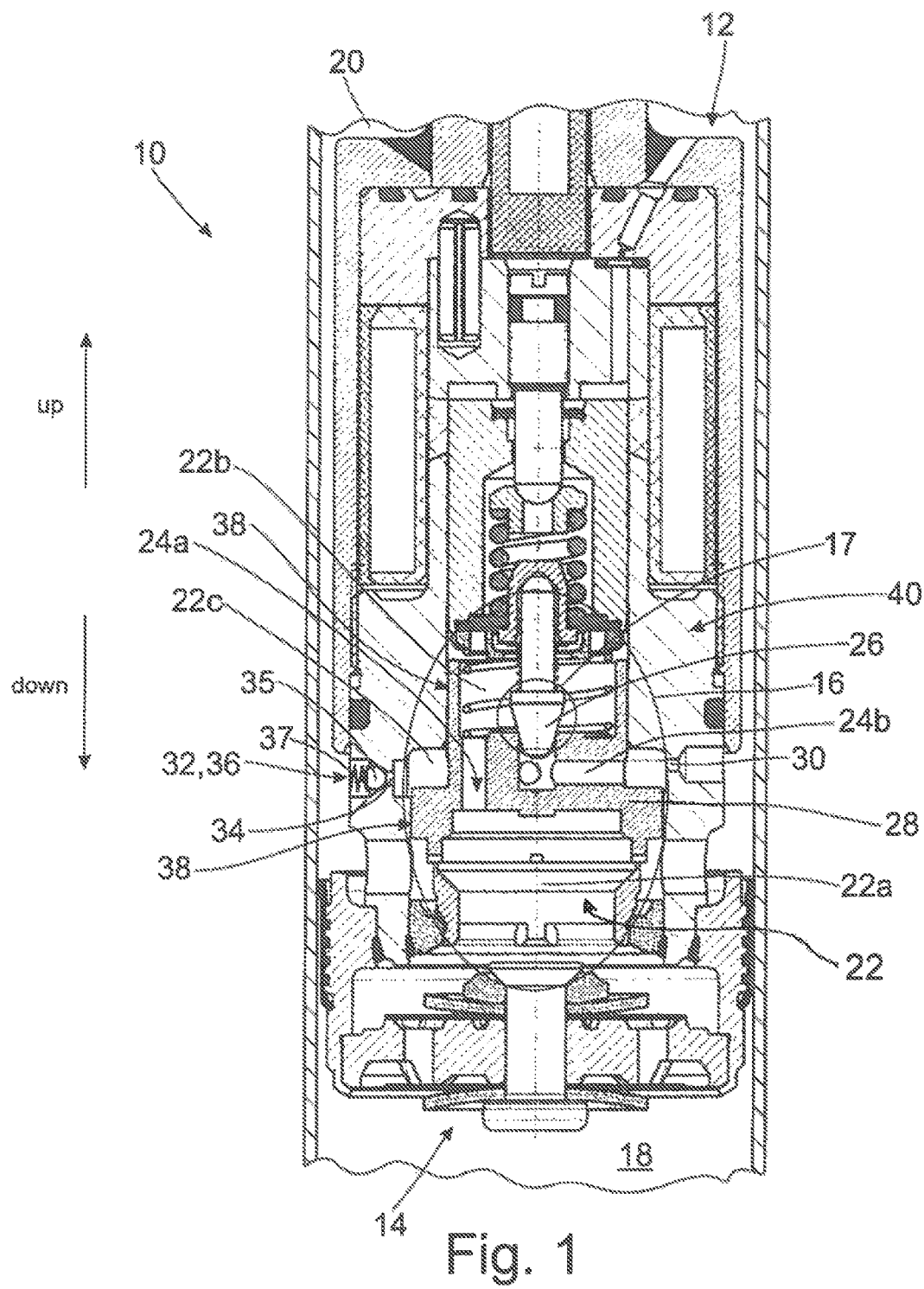
FIG. 1 is a partial cross-sectional view of a vibration damper with a damping valve and a pressure relief valve.

The directions "up" and "down" are shown in FIG. 1 and are used in the following for purposes of illustration.

FIG. 1 shows a cross section of a vibration damper 10 with an adjustable damping valve 12. The damping valve comprises an inlet valve 14, which is optional in this case, and an adjustable main valve 16 with a pre-valve 17. While the damping valve 12 separates a lower working space 18 from an upper working space 20, the main valve 16 divides the interior 22 into a plurality of partial spaces, including a main space 22a, a feed space 22b and a control space 22c. In the preceding as well as in the following, the control space 22c is also designated as pressure space 22c. The main space 22a and the feed space 22b are connected to one another via a channel 24a in a main valve body 28. Further, when a valve cone 26 of the pre-valve 17 lifts from the main valve body 28, a connection is made or blocked between the feed space 22b and the control space 22c via a further channel 24b. Further, the control space 22c is permanently operatively connected to the upper working space 20 via a choke orifice 30 which is arranged at an inner valve housing 40.

Further, the control space 22c is limited by the inner valve housing 40 and the main valve body 28. The main valve body 28 is arranged inside the valve housing 40 and is guided so as to be axially movable relative to the valve housing 40 via guide surfaces 38. During normal operation of the damping valve 12, a flow of damping medium from the main space 22a and the feed space 22b via the guide surfaces 38 to the control space 22c is nonexistent or negligible such that the control space is substantially sealed relative to the main space 22a and the feed space 22b. No further comments concerning the functioning of the damping valve will be made here, but reference is made to U.S. Pat. No. 6,119,831 which describes the basic functioning. The entire disclosure of U.S. Pat. No. 6,119,831 is considered to be incorporated herein by reference.

In addition to the choke orifices 30, the damping valve 12 further has a pressure relief valve 32 at the inner valve housing 40, which pressure relief valve 32 can produce or block an operative connection between the control space 22c and the upper working space 20. The pressure relief valve 32 serves in this case as additional connection to the choke orifice 30 between the control space 22c and the upper working space 20. The pressure relief valve 32 is arranged parallel to the choke opening 30. Further, the pressure relief valve 32 is formed in particular by a check valve 36 which has a non-return member 35 which is preloaded opposite an opening 34 via a preloading element 37.

The pressure relief valve 32 opens during a movement of the damping valve 12 downward or in direction of the compressive stage in order to increase the flow cross section for the flow of the damping medium from control space 22c into the upper working space 20. The pressure relief valve 32 opens only after a pressure difference $\Delta P$ between the pressure in the control space 22c and the pressure in the upper working space 20, where the pressure in the control space 22c must be greater than in the upper working space 20. This is the case when the vibration damper 10 is highly loaded, particularly at high temperatures and high damping valve speeds because the pressure in the interior of the damping valve 12 is higher in this case, so that leakage flows may again occur between the guide surfaces 38 of the main valve body 28 and the inner valve housing 40. If the flow of damping medium via the guide surfaces 38 is greater than the outflow of damping medium via the choke orifices 30, the pressure rises in the control space 22c and the pressure relief valve 32 opens so as to allow the damping medium to flow out.

If the damping medium were not able to flow out quickly enough, the pressure in the interior of the damping valve 12 would rise sharply because, inter alia, the pressure impinging on control space 22c would lead to a closing force on the main valve body 28. The disadvantages which have already been described could occur owing to the continued rising pressure in the interior 22 of the damping valve, but this is prevented by the pressure relief valve 32.

The pressure relief valve 32 opens at a defined pressure difference $\Delta P \geq 0$ between control space 22c and upper working space 20. Basically, the pressure relief valve 32 is constructed such that a flow of pressure medium is allowed from the interior 22 of the damping valve 12 to the outside, but is prevented from the outside into the interior 22. Therefore, an overpressure in the upper working space 20 acts so as to close the pressure relief valve 32.

During a movement of the damping valve 12 upward or in pull or rebound direction, the pressure relief valve 32 is blocked so that the damping characteristic of the damping valve 12 in pull direction remains unchanged.

Figure 2:
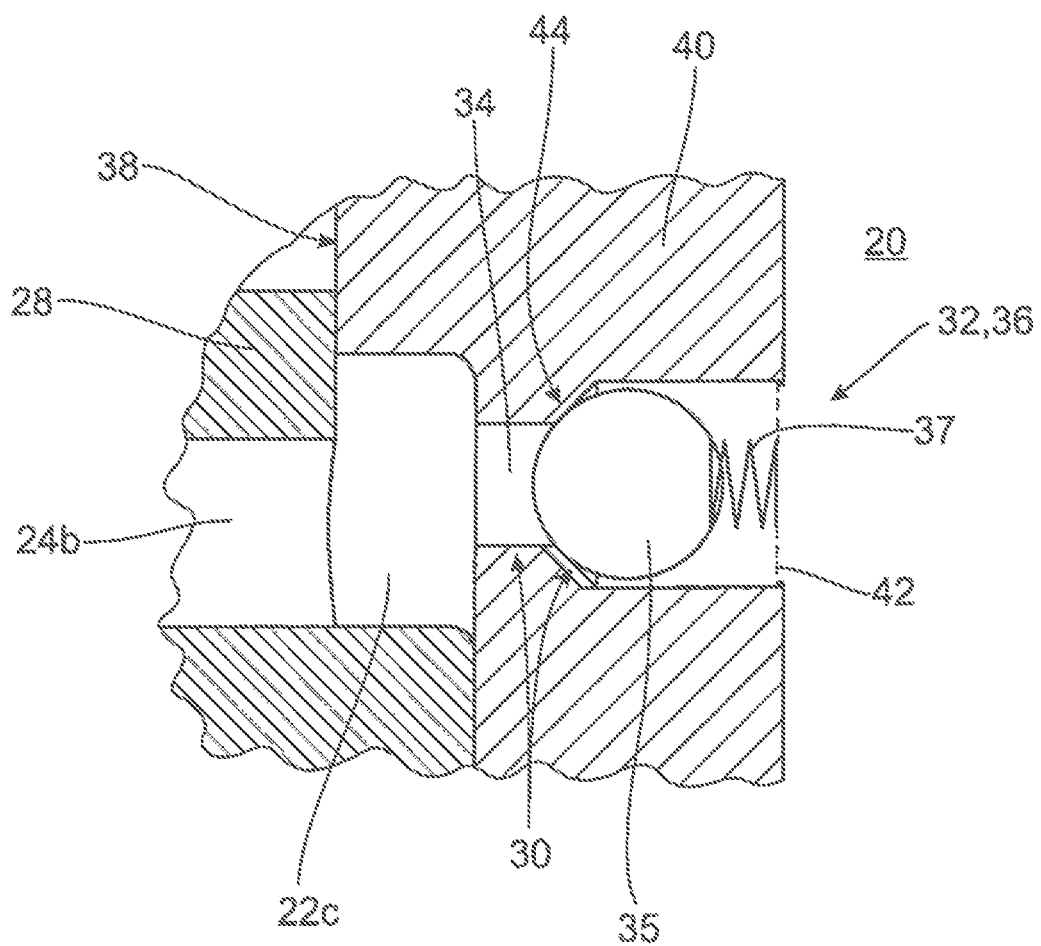
FIG. 2 is a partial cross-sectional view of another variant of the pressure relief valve from FIG. 1.
Figure 3:
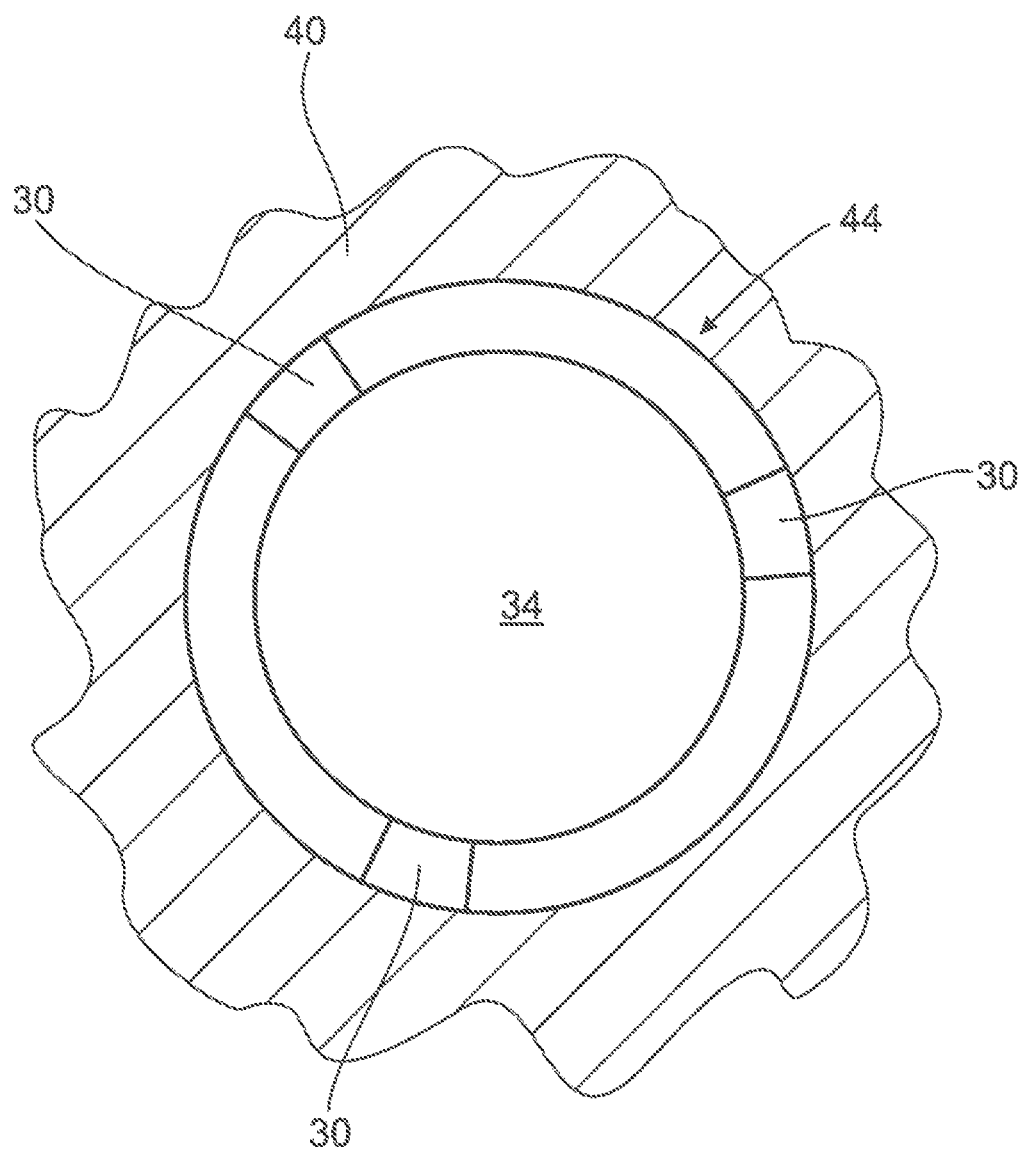
FIG. 3 is a further view of the pressure relief valve from FIG. 2.

FIG. 2 and FIG. 3 show a further variant of the pressure relief valve 32 which is constructed in this instance also as a check valve 36. The pressure relief valve 32 also forms the choke orifice 30. FIG. 2 shows the non-return member 35 which is preloaded opposite an overpressure valve seat 44 by means of the preloading spring 37, which is supported at a fluid-permeable supporting plate 42, and the non-return member. In this way, a damping medium can flow from the upper working space 20, between the non-return member 35, past the valve housing 40, through a groove 30 at the overpressure valve seat 44 into opening 34 and then into the control space 22c. The choke orifice 30 is formed in particular through the groove 30 and the opening 34, and the flow cross section of the groove 30 operates in a limiting manner. A plurality of grooves can be arranged at the overpressure valve seat 44 to enlarge a flow cross section. The pressure relief valve 32 restricts the flow of damping medium through the pressure relief valve 32 in the second direction. If the flow of damping medium is reversed, the non-return member 35 lifts from the overpressure valve seat 44 opposite the preloading and releases opening 34 so that the flow cross section is substantially increased in the first direction. An overpressure in the control space 22c relative to the upper working space 20 can be reduced in this way.

FIG. 3 shows a top view of the pressure relief valve 44, wherein a plurality of grooves 30 are uniformly distributed at the overpressure valve seat 44.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed:

1. An adjustable damping valve (12) comprising:
a pressure space (22c) for controlling the damping valve (12), the pressure space (22c) arranged inside the damping valve (12) and connected to a further space (20) via at least one permanently open choke orifice (30) for the flow of damping medium, and wherein the pressure space (22c) is operatively connected to the further space (20) via a pressure relief valve (32), and wherein the pressure relief valve (32) is connected in parallel with the choke orifice (30).

2. The adjustable damping valve (12) according to claim 1, wherein the pressure relief valve (32) forms the choke orifice (30).

3. The adjustable damping valve (12) according to claim 1, wherein the pressure relief valve (32) is formed by a check valve (36).

4. The adjustable damping valve (12) according to claim 1, wherein, when the damping valve (12) is loaded, the pressure relief valve (32) releases in a first direction and blocks in a second direction, or restricts the flow of damping medium through the damping valve (12) in the second direction.

5. The adjustable damping valve (12) according to claim 4, wherein the first direction corresponds to a loading of the damping valve (12) in push direction or in pull direction.

6. The adjustable damping valve (12) according to claim 1, wherein the pressure relief valve (32) is opened when the damping valve (12) is loaded in a first direction after a predetermined pressure difference between the pressure space (22c) and the further space (20).

7. The adjustable damping valve (12) according to claim 1, wherein the further space (20) is a working space (20) outside of the damping valve (12) forms.

8. A vibration damper (10) having an adjustable damping valve (12) according to claim 1.

9. The adjustable damping valve (12) according to claim 1, wherein the pressure relief valve (32) is located and constructed so as to increase a flow cross section for the flow of damping medium during a compression stroke of the damping valve.

* * * * *